(12) United States Patent
Deptolla

(10) Patent No.: US 6,467,849 B1
(45) Date of Patent: Oct. 22, 2002

(54) MOTOR VEHICLE SEAT WITH A SEATBELT BUCKLE MOUNTING

(75) Inventor: Bernd Deptolla, Niedernwöhren (DE)

(73) Assignee: Bertrand Faure Sitztechnik GmbH & Co. KG, Stadthagen (DE)

( * ) Notice: Subject to any disclaimer, the term of this patent is extended or adjusted under 35 U.S.C. 154(b) by 1 day.

(21) Appl. No.: 09/631,298

(22) Filed: Aug. 2, 2000

(30) Foreign Application Priority Data

Aug. 3, 1999 (DE) .......................................... 199 35 616

(51) Int. Cl.⁷ .............................................. B60R 21/00
(52) U.S. Cl. .................... 297/464; 297/473; 297/216.1; 297/344.15
(58) Field of Search ................................ 297/464, 470, 297/473, 216.1, 216.15, 344.11, 344.13, 344.15

(56) References Cited

U.S. PATENT DOCUMENTS

| | | | | |
|---|---|---|---|---|
| 4,225,184 A | * | 9/1980 | Strowick | 297/216.1 X |
| 4,248,480 A | * | 2/1981 | Koucky et al. | 297/473 |
| 4,676,555 A | * | 6/1987 | Tokugawa | 297/473 |
| 4,790,597 A | * | 12/1988 | Bauer et al. | 297/473 X |
| 4,923,214 A | * | 5/1990 | Siegrist et al. | 297/473 X |
| 5,226,697 A | * | 7/1993 | Borlinghaus et al. | 297/473 X |
| 5,282,672 A | * | 2/1994 | Borlinghaus | 297/473 X |
| 6,116,689 A | * | 9/2000 | Bauer et al. | 297/473 X |

FOREIGN PATENT DOCUMENTS

| | | |
|---|---|---|
| DE | 36 42 349 C2 | 5/1988 |
| DE | 38 37 170 A1 | 5/1990 |
| EP | 0 265 747 A2 | 5/1988 |
| EP | 0 306 122 A2 | 3/1989 |

\* cited by examiner

*Primary Examiner*—Rodney B. White
(74) *Attorney, Agent, or Firm*—Connolly Bove Lodge & Hutz LLP

(57) ABSTRACT

A motor vehicle seat has longitudinal adjustment tracks, a device for adjusting elevation and inclination, and a seatbelt buckle mounting, which has a first part that is coupled to an upper track of the longitudinal adjustment tracks and a second part that is coupled to the seat part so as to be capable of pivoting and that is guided on a longitudinal guiding surface of the first part so that its position may be freely shifted. The first part has a catch toothing, which is embodied so as to accept a catch projection provided on a second part, such that the coupling point of the second part and its catch projection are arranged on different sides of the first part. The guiding surface is provided on only one side of the first part, and the opposing surface of the second part, which works in concert with it, is held in contact with the guiding surface by a spring until a load limit of the seatbelt buckle mounting is reached. When the load limit is exceeded, the opposing surface is lifted from the guiding surface and the catch projection pivots into the toothing of the catch.

6 Claims, 4 Drawing Sheets

MOTOR VEHICLE SEAT WITH A SEATBELT BUCKLE MOUNTING

FIELD OF THE INVENTION

The present invention pertains to a motor vehicle seat with longitudinal upper and lower adjustment tracks.

BACKGROUND OF THE INVENTION

In the case of a known motor vehicle seat of this type, see for example, EP 0 265 747 B 1, the seatbelt buckle mounting is embodied as two pieces, so that the part that is connected with the upper track of the seat's longitudinal adjustment device is surrounded by a closed longitudinal guide of the other part. The longitudinal guide permits the shifting of both parts towards each other when the motor vehicle seat is adjusted in elevation or inclination. In the event of a crash, however, both parts must be pivoted towards each other so that a catch projection on one part engages the catch toothing of the other part. Pivoting is possible only if the longitudinal guide is destroyed.

The amount of the pivoting torque, which expands or shears off the longitudinal guide and causes the catch projection to engage the catch toothing, is difficult to determine in advance and to maintain accurately during manufacturing. Premature engagement of the catch toothing must be avoided at all costs, because with each engagement, the seatbelt mounting becomes unusable. In addition, the effective duration of the forces that are necessary to expand or shear off the longitudinal guide can delay the catching process.

Taking this state of the art as a point of departure, the main purpose of the invention is to improve the seatbelt buckle mounting on known types of motor vehicle seats, so that when used, the mounting is not destroyed and is effective in the presence of a defined triggering force.

SUMMARY OF THE INVENTION

This task is accomplished with the longitudinal adjustment device including the guiding surface provided on only one side of the first part of the seat buckle mounting and the opposing surface of the second part, which works in concert with it, is held by means of a spring in contact with the guiding surface until the load limit of the seatbelt buckle mounting is reached and when the load limit that is determined by the retentive force of the spring is exceeded, the opposing surface is lifted from the guiding surface and the catch projection of the second part pivots into the catch toothing of the first part.

The spring permits a precise calculation of the retentive force at which the catching of the seat belt mounting occurs. When catching occurs, no structural elements are damaged or destroyed; therefore, catching can be induced at an early stage when the motor vehicle undergoes comparatively slight decelerations. The spring prevents the seatbelt buckle from rattling when the vehicle seat is unoccupied.

In the following, two preferred embodiments of the present invention are described in detail with reference to the accompanying drawings, wherein:

DETAILED DESCRIPTION OF THE PREFERRED EMBODIMENTS

Figure 1:
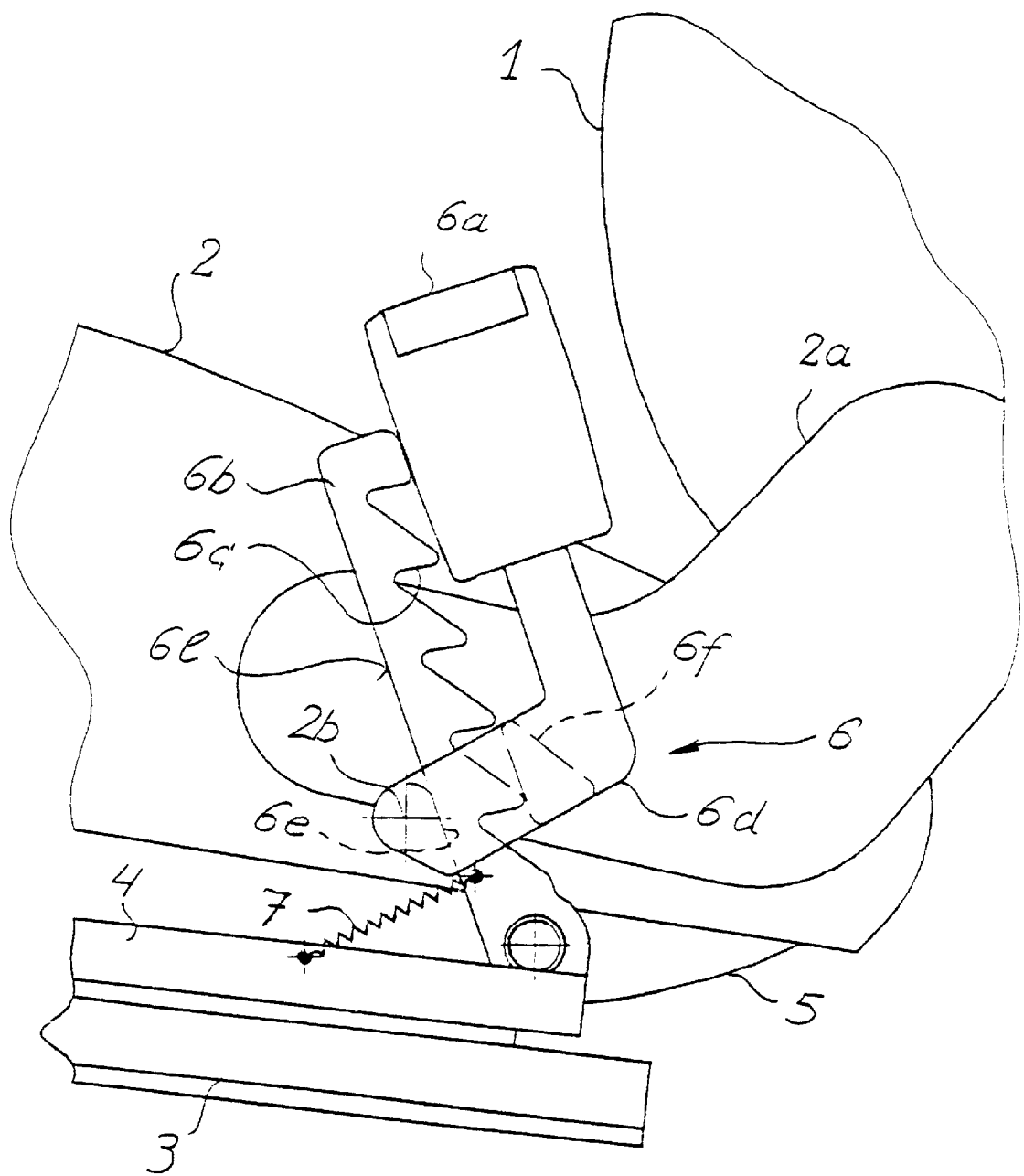
FIG. 1 shows a schematic side view of a constituent area of a lowered motor vehicle seat with an initial embodiment form of a seatbelt buckle mounting in the unengaged state.

In the drawings, identical parts are labeled with identical reference symbols that may be distinguished from each other, if necessary, by prime marks.

In the drawings, the only parts of the motor vehicle seat that appear are the posterior end of seat section 2 and the lower end of a backrest 1, which is connected to seat section 2 by a fitting piece 2a. The motor vehicle seat is linked to upper tracks 4 by means of guide bars 5 that are pivotable to adjust the seat height. The upper tracks 4 are seated on lower tracks 3, which are firmly connected to the vehicle's body so that the longitudinal position of the upper tracks 4 may be shifted.

On the motor vehicle seat, a seatbelt buckle 6a is provided for a safety belt, which is not shown. The tensile force that would be exerted by the safety belt is connected to upper track 4 of the seat's longitudinal adjustment device by way of a seatbelt buckle mounting 6. In the normal secure state, seatbelt buckle 6a retains its position of pivot relative to the motor vehicle seat, irrespective of the seat's longitudinal or height adjustment.

The seatbelt buckle mounting 6 has two parts. A first part 6b is linked to the upper track 4 so that it can pivot. A second part 6d is seated in articulated fashion at a coupling point on seat part 2. In adjusting the elevation of the motor vehicle seat, the second part 6d is moved along the first part 6b.

The first part 6b exhibits a guiding surface 61 that runs in its longitudinal direction and touches an opposing surface 6e of the second part. On the side that lies opposite the guiding surface 61, the first part 6b has catch toothing 6c, which is embodied as saw teeth extending in parallel to the guiding surface 61.

The opposing surface 6e is embodied on a cam 6g that is provided on the end of the second part 6d, where coupling occurs. Opposite the catch toothing 6c, the second part 6d bears a catch projection 6f. The first part 6b extends between the cam 6g and the catch projection 6f and it is held by a spring 7 so as be in touch with the opposing surface 6e whereby the catch projection 6f cannot engage the catch toothing 6c.

Figure 2:
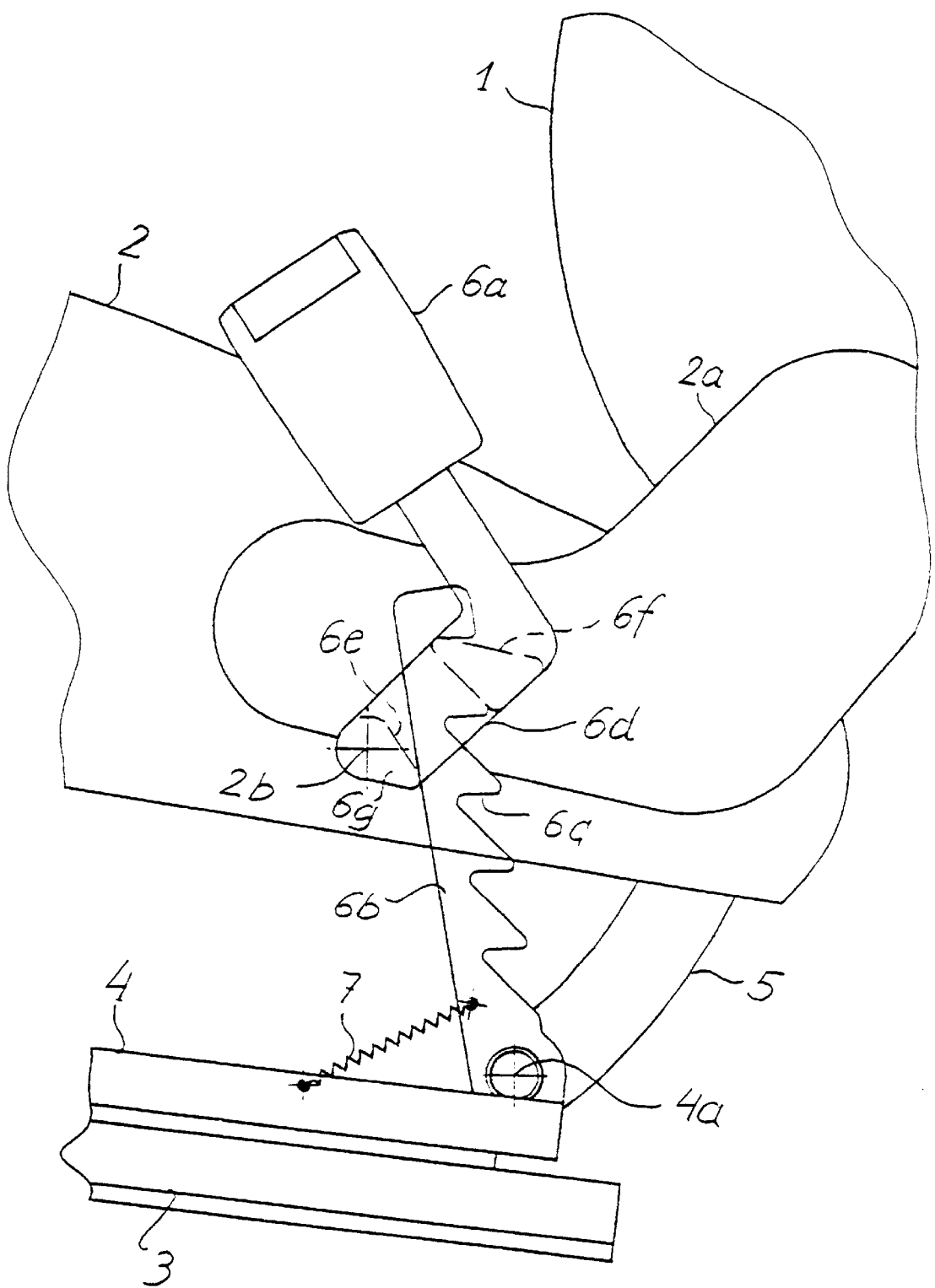
FIG. 2 shows the side view of the constituent area according to FIG. 1, with a raised vehicle seat, in the engaged state.

FIGS. 1 and 2 show a first embodiment of the second part 6d, which appears as a bent lever with one end seated on seat part 2, so that it can be slued around the axis 2b, and the other end bearing the seatbelt buckle 6a. The lever arm of the bent lever that bears the catch projection 6f lies in its initial position, approximately transverse to the longitudinal direction of the first part. In every possible position of the seat, a tooth space of the catch toothing 6c lies opposite the catch projection 6f.

A tensile force exerted upon seatbelt buckle 6a will slue the second part 6d around the pivoting axis 2b. When the force of contact exerted by spring 7 between longitudinal guide surface 61 and the opposing surface 6e is exceeded, the second part 6d pivots around the axis 2b of its coupling point. The first part 6b is slued by the cam 6g around the axis 4a in a clockwise direction. As a result of the motion of the first part 6b and the second part 6d in opposite directions, the catch projection 6f engages the catch toothing 6c. The tensile force that acts upon the seatbelt is imparted to the first part 6b by the second part 6d by way of the catch, and, thus, to the upper track 4.

Figure 3:
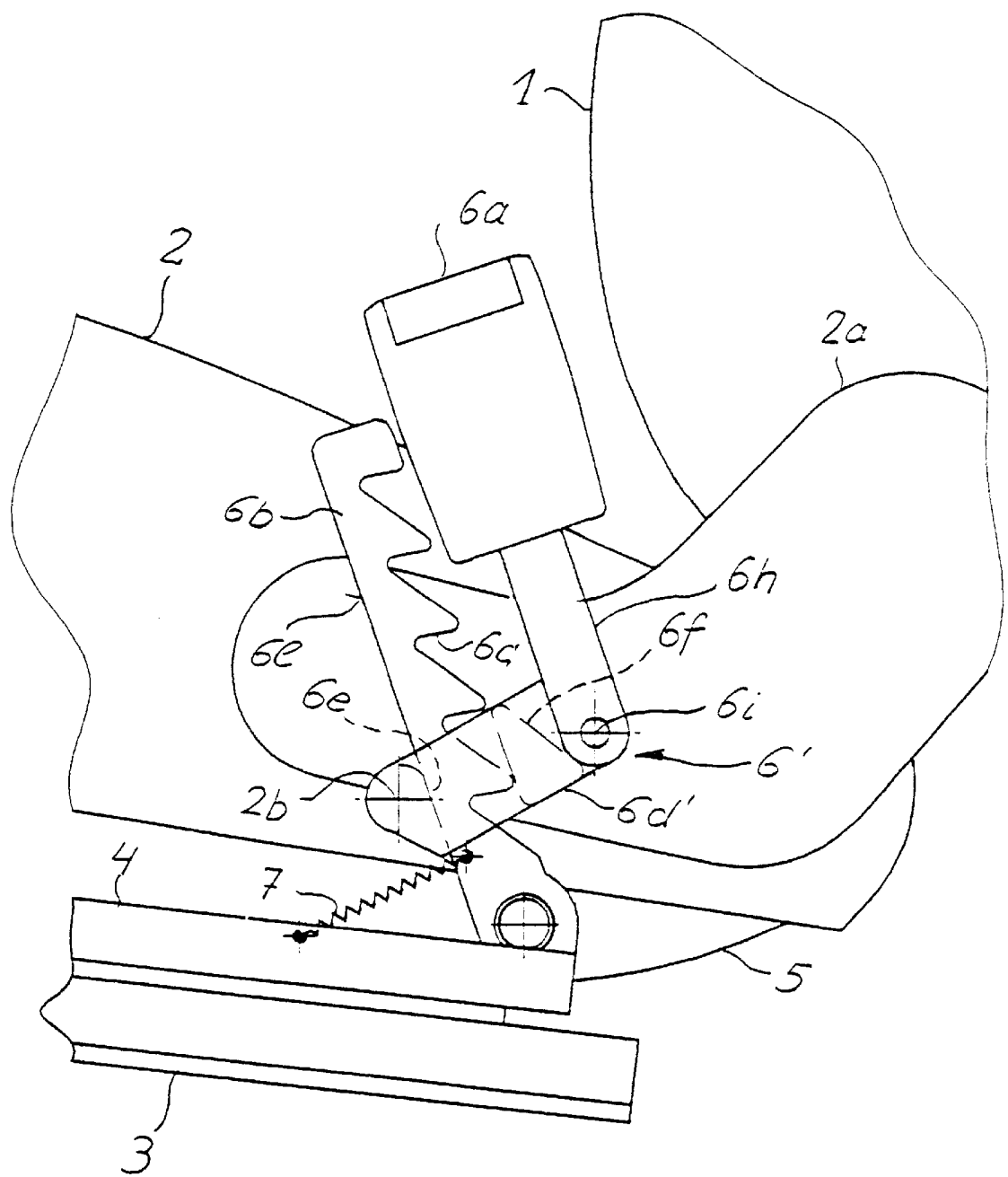
FIG. 3 shows a side view of a motor vehicle seat, analogous to FIG. 1, with a second embodiment form of the seatbelt buckle mounting.
Figure 4:
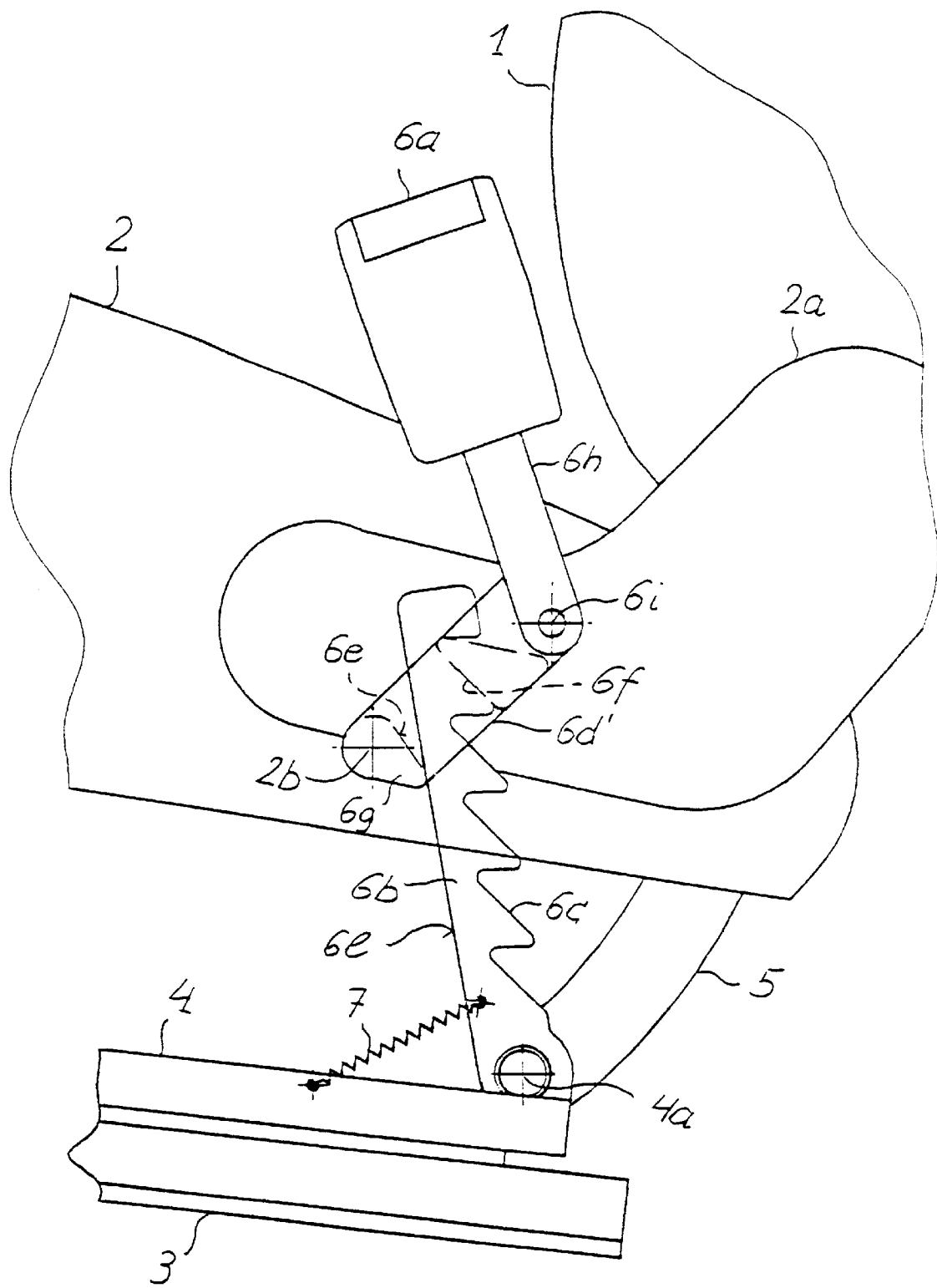
FIG. 4 shows the side view of the motor vehicle seat according to FIG. 3, with the vehicle seat raised and in the engaged state.

The second embodiment, which is illustrated in FIGS. 3 and 4, differs from the one described above only by virtue of the embodiment of the second part 6d of the seatbelt buckle mounting 6'. The second part 6d' is seated in the coupling point 2b and exhibits catch projection 6f, and at the end that lies opposite the coupling point 2b, 6d' is connected, so that it can pivot, to a strap 6h to which the seatbelt buckle 6a is attached. Strap 6, which is seated on the second part 6d' so as to be capable of being slued around an axis 6i, permits the seatbelt buckle 6a to move without hindrance in the direction of the course of the seatbelt. The security of the latching remains unaffected by this because a tensile force that acts upon the seatbelt buckle 6a always leads to torque around the axis 2b of the coupling point.

I claim:

1. A seat for a motor vehicle comprising: longitudinal adjustment tracks having an upper track that is movable longitudinally upon a lower track that is firmly attached to the vehicle; a device for adjusting the elevation and inclination of the seat; a seat belt buckle mounting having a first part coupled to the upper track and a second part connected to a seatbelt buckle, wherein the second part pivots with the seat around a pivoting axis and shifts freely on a longitudinal guiding surface of the first part, the guiding surface of the first part provided on only one side of the first part and contacting an opposing surface of the second part, and the first part having a catch toothing to accept a catch projection provided on the second part; and a spring that precludes engagement of the catch toothing and the catch projection if the load limit of the seatbelt buckle mounting is not exceeded, the load limit determined by the retentive force of the spring.

2. A seat according to claim 1, wherein the spring engages the catch toothing and the catch projection if the load limit is exceeded.

3. A seat according to claim 1, wherein the opposite surface of the second part is part of a cam that slues around the pivoting axis.

4. A seat according to claim 1, wherein the pivoting axis, viewed in the direction of travel, is arranged in front of the guiding surface of the first part.

5. A seat according to claim 1, wherein the spring is a tension spring disposed between the upper track and the first part.

6. A seat according to claim 1, wherein the second part is an angled member with one arm bearing the seatbelt buckle, and the other arm bearing the catch projection.

* * * * *